(12) United States Patent
Rozental et al.

(10) Patent No.: US 11,977,021 B2
(45) Date of Patent: May 7, 2024

(54) PHASE MODULATED PULSE INTERFEROMETRY FOR MULTI-CHANNEL ULTRASOUND DETECTION

(71) Applicant: TECHNION RESEARCH & DEVELOPMENT FOUNDATION LIMITED, Haifa (IL)

(72) Inventors: Amir Rozental, Haifa (IL); Yoav Hazan, Haifa (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 589 days.

(21) Appl. No.: 17/268,859

(22) PCT Filed: Aug. 19, 2019

(86) PCT No.: PCT/IL2019/050923
§ 371 (c)(1),
(2) Date: Feb. 16, 2021

(87) PCT Pub. No.: WO2020/039427
PCT Pub. Date: Feb. 27, 2020

(65) Prior Publication Data
US 2021/0349009 A1    Nov. 11, 2021

Related U.S. Application Data

(60) Provisional application No. 62/719,672, filed on Aug. 19, 2018.

(51) Int. Cl.
*G01N 21/17*    (2006.01)
*G01H 9/00*    (2006.01)
(Continued)

(52) U.S. Cl.
CPC ..... *G01N 21/1702* (2013.01); *G01N 2201/08* (2013.01)

(58) Field of Classification Search
CPC .......... G01N 29/2418; G01N 21/1702; G01N 29/343; G01N 29/036; G01N 2291/0256;
(Continued)

(56) References Cited

U.S. PATENT DOCUMENTS

2001/0042410 A1* 11/2001 Ogawa ................. G01N 29/449
73/656
2012/0156802 A1   6/2012 Flagan et al.
(Continued)

FOREIGN PATENT DOCUMENTS

EP    3269077 A1    1/2018

OTHER PUBLICATIONS

Patrick F. Tekavec, Thomas R. Dyke, Andrew H. Marcus; Wave packet interferometry and quantum state reconstruction by acousto-optic phase modulation. J. Chem. Phys. Nov. 21, 2006; 125 (19): 194303. https://doi.org/10.1063/1.2386159 (Year: 2006).*
(Continued)

*Primary Examiner* — Uzma Alam
*Assistant Examiner* — Adrian Ignacio Silva
(74) *Attorney, Agent, or Firm* — The Roy Gross Law Firm, LLC; Roy Gross

(57) ABSTRACT

A method comprising: generating a pulsed laser beam comprised of non-interfering pulse-pairs having a phase difference, wherein the phase difference changes between each two consecutive cycles of the pulse-pairs; directing the pulsed laser beam at one or more optical resonators, wherein each of the one or more optical resonators is impinged by acoustic waves, to cause the pulsed laser beam to propagate through each of the one or more optical resonators, thereby interfering the pulse-pairs; and calculating shifts in a spec-
(Continued)

tral response of each of the one or more optical resonators based on measuring the interference, wherein the shifts are indicative of a waveform of the acoustic waves.

19 Claims, 6 Drawing Sheets

(51) Int. Cl.
   *G01N 29/036* (2006.01)
   *G01N 29/24* (2006.01)
   *G01N 29/34* (2006.01)
(58) Field of Classification Search
   CPC .... G01H 9/00; G01H 9/008; Y10T 29/49005; H04R 23/008
   USPC ......................................................... 356/478
   See application file for complete search history.

(56) References Cited

U.S. PATENT DOCUMENTS

| | | | |
|---|---|---|---|
| 2014/0114187 A1* | 4/2014 | Rozental | A61B 8/44 600/407 |
| 2018/0003552 A1* | 1/2018 | Lewin | G02B 6/4213 |

OTHER PUBLICATIONS

Rosenthal A, Razansky D, Ntziachristos V. Wideband optical sensing using pulse interferometry. Opt Express. Aug. 13, 2012;20(17):19016-29. doi: 10.1364/OE.20.019016. PMID: 23038542.

Rosenthal, A., Kellnberger, S., Bozhko, D., Chekkoury, A., Omar, M., Razansky, D., & Ntziachristos, V. (2014). Sensitive interferometric detection of ultrasound for minimally invasive clinical imaging applications. Laser & Photonics Reviews, 8(3), 450-457. doi: 10.1002/lpor.201300204.

Hazan, Y., & Rosenthal, A. (2018). Passive-demodulation pulse interferometry for ultrasound detection with a high dynamic range. Optics letters, 43(5), 1039-1042.

Volodarsky, O., Hazan, Y., & Rosenthal, A. (2018). Ultrasound detection via low-noise pulse interferometry using a free-space Fabry-Pérot. Optics express, 26(17), 22405-22418.

Rosenthal, A., Razansky, D., & Ntziachristos, V. (2011). High-sensitivity compact ultrasonic detector based on a pi-phase-shifted fiber Bragg grating. Optics Letters, 36(10), 1833. doi:10.1364/ol. 36.001833.

Huntley, J. M., & Saldner, H. (1993). Temporal phase-unwrapping algorithm for automated interferogram analysis. Applied Optics, 32(17), 3047. doi: 10.1364/ao.32.003047.

D. Stowe, D. Moore, and R. Priest, "Polarization fading in fiber interferometric sensors," IEEE Journal of Quantum Electronics, vol. 18, No. 10, pp. 1644-1647, Oct. 1982.

Amir Rosenthal, Miguel Ángel Araque Caballero, Stephan Kellnberger, Daniel Razansky, and Vasilis Ntziachristos, "Spatial characterization of the response of a silica optical fiber to wideband ultrasound," Opt. Lett. 37, 3174-3176 (2012).

Veres, I. A., Burgholzer, P., Berer, T., Rosenthal, A., Wissmeyer, G., & Ntziachristos, V. (2014). Characterization of the spatio-temporal response of optical fiber sensors to incident spherical waves. The Journal of the Acoustical Society of America, 135(4), 1853-1862. doi: 10.1121/1.4868391.

M. Xu and L. V. Wang. Photoacoustic imaging in biomedicine. Review of Scientific Instruments. 77, 041101, (2006).

S. Kellnberger, A. Rosenthal, A. Myklatun, G. G. Westmeyer, G. Sergiadis, and V. Ntziachristos. Magnetoacoustic Sensing of Magnetic Nanoparticles. Phys. Rev. Lett. 116, 108103, (2016).

Yu Wang, Zijian Guo, Lihong V. Wang, Todd N. Erpelding, Ladislav Jankovic, Jean-Luc Robert, and Guillaume David "In vivo three-dimensional photoacoustic imaging based on a clinical matrix array ultrasound probe," Journal of Biomedical Optics 17(6), 061208 (May 7, 2012). https://doi.org/10.1117/1.JBO. 17.6.061208.

Chris Ceroici, Katherine Latham, Ryan Chee, Ben Greenlay, Quinn Barber, Jeremy A. Brown, and Roger Zemp, "3D photoacoustic imaging using Hadamard-bias encoding with a crossed electrode relaxor array," Opt. Lett. 43, 3425-3428 (2018).

Rosenthal A, Ntziachristos V, Razansky D. Acoustic Inversion in Optoacoustic Tomography: A Review. Curr Med Imaging Rev. Nov. 2013;9(4):318-336. doi: 10.2174/15734056113096660006. PMID: 24772060; PMCID: PMC3996917.

Sethuraman, S. Aglyamov, J. Amirian, R. Smalling, S. Emelianov, "Intravascular photoacoustic imaging using an IVUS imaging catheter," IEEE Transactions on Ultrasonics, Ferroelectrics, and Frequency Control, 54(5), 978-986 (2007).

Haindl, R., Preisser, S., Andreana, M., Rohringer, W., Sturtzel, C., Distel, M., Chen, Z., Rank, E., Fischer, B., Drexler, W., Liu, M. (2017) Dual modality reflection mode optical coherence and photoacoustic microscopy using an akinetic sensor. Optics letters. 42:4319-4322.

Fischer, B. (2016). Optical microphone hears ultrasound. Nature Photonics, 10(6), 356-358.

Li, H., Dong, B., Zhang, Z. et al. A transparent broadband ultrasonic detector based on an optical micro-ring resonator for photoacoustic microscopy. Sci Rep 4, 4496 (2014). https://doi.org/10.1038/srep04496.

Stefan Preisser, Wolfgang Rohringer, Mengyang Liu, Christian Kollmann, Stefan Zotter, Balthasar Fischer, and Wolfgang Drexler, "All-optical highly sensitive akinetic sensor for ultrasound detection and photoacoustic imaging," Biomed. Opt. Express 7, 4171-4186 (2016).

H. Grün, T. Berer, P. Burgholzer, R. Nuster, and G. Paltauf, Three-dimensional photoacoustic imaging using fiber-based line detectors, J. Biomed. Opt. 15 (2), 021306 (Mar. 1, 2010) https://doi.org/10.1117/1.3381186.

Ling, T., Chen, S. L., & Guo, L. J. (2011). High-sensitivity and wide-directivity ultrasound detection using high Q polymer microring resonators. Applied Physics Letters, 98(20), 204103.

Rosenthal A, Razansky D, Ntziachristos V. High-sensitivity compact ultrasonic detector based on a pi-phase-shifted fiber Bragg grating. Opt Lett. May 15, 2011;36(10):1833-5. doi: 10.1364/OL. 36.001833. PMID: 21593906.

S. Ashkenazi, C.-Y. Chao, L. J. Guo, and M. O'Donnell, Ultrasound detection using polymer microring optical resonator, Appl. Phys. Lett., 85, 5418, (2004).

Pc, Beard & Mills, Tim. (2000). Optical detection system for biomedical photoacoustic imaging. SPIE BIOS. 3916. 100-109. 10.1117/12.386310.

Saverio Avino, Jack A. Barnes, Gianluca Gagliardi, Xijia Gu, David Gutstein, James R. Mester, Costa Nicholaou, and Hans-Peter Loock, "Musical instrument pickup based on a laser locked to an optical fiber resonator," Opt. Express 19, 25057-25065 (2011).

Nam Huynh, Edward Zhang, Marta Betcke, Simon Arridge, Paul Beard, and Ben Cox, "Single-pixel optical camera for video rate ultrasonic imaging," Optica 3, 26-29 (2016).

Haniel Gabai, Idan Steinberg, and Avishay Eyal, "Multiplexing of fiber-optic ultrasound sensors via swept frequency interferometry," Opt. Express 23, 18915-18924 (2015).

Amir Rosenthal, Murad Omar, Héctor Estrada, Stephan Kellnberger, Daniel Razansky, and Vasilis Ntziachristos. Embedded ultrasound sensor in a silicon-on-insulator photonic platform. Appl. Phys. Lett. 104, 021116 (2014); https://doi.org/10.1063/1.4860983.

Murad Omar, Jerome Gateau, and Vasilis Ntziachristos, "Raster-scan optoacoustic mesoscopy in the 25-125 MHZ range," Opt. Lett. 38, 2472-2474 (2013).

Dussik, K.T. Über die Möglichkeit, hochfrequente mechanische Schwingungen als diagnostisches Hilfsmittel zu verwerten. Z. f. d. g. Neur. u. Psych. 174, 153-168 (1942). https://doi.org/10.1007/BF02877929.

Zhang, C., Ling, T., Chen, S. L., & Guo, L. J. (2014). Ultrabroad bandwidth and highly sensitive optical ultrasonic detector for photoacoustic imaging. Acs Photonics, 1(11), 1093-1098.

(56) References Cited

OTHER PUBLICATIONS

Wissmeyer, G., Pleitez, M.A., Rosenthal, A et al. Looking at sound: optoacoustics with all-optical ultrasound detection. Light Sci Appl 7, 53 (2018). https://doi.org/10.1038/s41377-018-0036-7.
Wei, H., Amrithanath, A. K., & Krishnaswamy, S. (2018). High-frequency ultrasonic sensor arrays based on optical micro-ring resonators. In T. Kundu (Ed.), Health Monitoring of Structural and Biological Systems XII [1060003] Proceedings of SPIE—The International Society for Optical Engineering; vol. 10600). SPIE. https://doi.org/10.1117/12.2296273.
Wei, H., & Krishnaswamy, S. (2017). Polymer micro-ring resonator integrated with a fiber ring laser for ultrasound detection. Optics letters, 42(13), 2655-2658.
Hazan, Y., & Rosenthal, A. (May 2019). Phase modulated pulse interferometry for simultaneous multi-channel ultrasound detection. In CLEO: Science and Innovations (pp. SW3L-2). Optical Society of America.
PCT International Search Report for International Application No. PCT/IL2019/050923, dated Dec. 18, 2019, 3pp.
PCT Written Opinion for International Application No. PCT/IL2019/050923, dated Dec. 18, 2019, 4pp.

\* cited by examiner

PHASE MODULATED PULSE INTERFEROMETRY FOR MULTI-CHANNEL ULTRASOUND DETECTION

CROSS REFERENCE TO RELATED APPLICATIONS

This application is a National Phase of PCT Patent Application No. PCT/IL2019/050923 having International filing date of Aug. 19, 2019, which claims the benefit of priority from U.S. Provisional Patent Application No. 62/719,672, filed on Aug. 19, 2018, the contents of which are all incorporated by reference herein in their entirety.

BACKGROUND

The invention relates to the field of ultrasound detection.

In the last decade, there has been an increasing interest in optical techniques for ultrasound detection, as alternative to piezoelectric devices, e.g., in biomedical applications. One of the common optical approaches for ultrasound detection is the use of optical resonators, which can trap light within small volumes and thus facilitate detector miniaturization without loss of sensitivity. When an acoustic wave impinges on an optical resonator, it perturbs its refractive index and deforms its structure, resulting in a modulation of the resonance wavelength. By monitoring the shifts in the resonance wavelength, one can effectively measure the ultrasound-induced pressure within the resonator.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a method comprising: generating a pulsed laser beam comprised of non-interfering pulse-pairs having a phase difference, wherein said phase difference changes between each two consecutive cycles of said pulse-pairs; directing said pulsed laser beam at one or more optical resonators, wherein each of said one or more optical resonators is impinged by acoustic waves, to cause said pulsed laser beam to propagate through each of said one or more optical resonators, thereby interfering said pulse-pairs; and calculating shifts in a spectral response of each of said one or more optical resonators based on measuring said interference, wherein said shifts are indicative of a waveform of said acoustic waves.

In some embodiments, each of said cycles of said pulse-pairs comprises one or more consecutive pulse-pairs.

In some embodiments, said calculating is performed with respect to at least two cycles of said pulse-pairs.

In some embodiments, said pulse-pairs have identical wavelengths.

In some embodiments, said one or more optical resonators are selected from the group consisting of: π phase-shifted Bragg grating (π-BG), Fabry-Perot cavity, and optical-ring resonator.

In some embodiments, said generating of said pulse-pairs is performed from a single pulse via an active unbalanced Mach-Zehnder interferometer (MZI) with a phase modulator in one of its arms.

In some embodiments, said phase modulator is configured to induce a constant phase shift during a duration of each of said pulses.

In some embodiments, said measuring further comprises measuring an optical power transmission in said propagated pulsed laser beam, wherein said optical power transmission is indicative of said shifts is said spectral response.

In some embodiments, said measuring of said optical power transmission is performed by at least one photo-detector.

In some embodiments, said acoustic waves are ultrasound acoustic waves.

There is also provided, in an embodiment, a system comprising: one or more optical resonators; and an interferometer configured to generate, from a pulsed laser beam source, a pulsed laser beam comprised of non-interfering pulse-pairs having a phase difference, wherein said phase difference changes between each two consecutive cycles of said pulse-pairs; wherein said pulse-pairs are directed to said one or more optical resonators to propagate said pulse-pairs through said one or more optical resonators, thereby interfering said pulse-pairs.

In some embodiments, said interferometer is further configured to measure said interference when said one or more optical resonators are being impinged by acoustic waves, to calculate shifts in a spectral response of each of said one or more optical resonators based on said measuring; wherein said shifts are indicative of a waveform of said acoustic waves.

In some embodiments, said calculating is performed with respect to at least two cycles of said pulse-pairs.

In some embodiments, each of said cycles of said pulse-pairs comprises one or more consecutive pulse-pairs.

In some embodiments, said pulse-pairs have identical wavelengths.

In some embodiments, said one or more optical resonators are selected from the group consisting of: π phase-shifted Bragg grating (π-BG), Fabry-Perot cavity, and optical-ring resonator.

In some embodiments, said interferometer is an active unbalanced Mach-Zehnder interferometer (MZI) with a phase modulator in one of its arms, configured to generate said pulse-pairs from a single pulse.

In some embodiments, said phase modulator is configured to induce a constant phase shift during a duration of each of said pulses.

In some embodiments, said interferometer is further configured to measure an optical power transmission in said propagated pulsed laser beam, wherein said optical power transmission is indicative of said shifts is said spectral response.

In some embodiments, said measuring of said optical power transmission is performed by at least one photo-detector.

In some embodiments, said acoustic waves are ultrasound acoustic waves.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein are a system and method for ultrasound detection based on pulse interferometry (PI), configured to simultaneously interrogate multiple optical resonators with non-overlapping spectra. In some embodiments, the present disclosure provides for parallel interrogation of up to four resonators with non-overlapping spectra using only a single wave source.

In some embodiments, the present disclosure is based, at least in part, on a phase-modulation (i.e., phase modulation-pulse interferometry, or PM-PI) scheme performed at the output of the source, which couples between the intensity and wavelength at the output of the resonators. In some embodiments, a demodulation algorithm of the present disclosure may be configured to decode ultrasound-induced shifts in the wavelengths of multiple resonators from intensity measurements. Accordingly, in some embodiments, the present disclosure may only require a single photodetector and sampling channel per resonator.

Pulse interferometry has been developed as an alternative approach for interrogating optical resonators, which may potentially overcome some of the limitations that have characterized CW interrogation (see, e.g., A. Rosenthal et al., "Wideband optical sensing using pulse interferometry," Optics Express, vol. 20, no. 17, p. 19016, August 2012; A. Rosenthal et al., "Sensitive interferometric detection of ultrasound for minimally invasive clinical imaging applications," Laser & Photonics Reviews, vol. 8, no. 3, pp. 450-457, 2014; Y. Hazan and A. Rosenthal, "Passive-demodulation pulse interferometry for ultrasound detection with a high dynamic range," Optics Letters, vol. 43, no. 5, p. 1039, March 2018; 0. Volodarsky, Y. Hazan, and A. Rosenthal, "Ultrasound detection via low-noise pulse interferometry using a free-space Fabry-Perot," Opt. Express, OE, vol. 26, no. 17, pp. 22405-22418, August 2018).

In PI, the source is based on a pulse laser whose bandwidth is sufficiently wide to cover the entire bandwidth in which the resonances may occur. Previously, this property was used to achieve a high dynamic range and robust operation under volatile environmental conditions. While PI may in principle be used to interrogate several resonators with non-overlapping spectra with a single source, previous demodulation schemes were not scalable, and involved relatively high costs per channel.

Figure 1A:
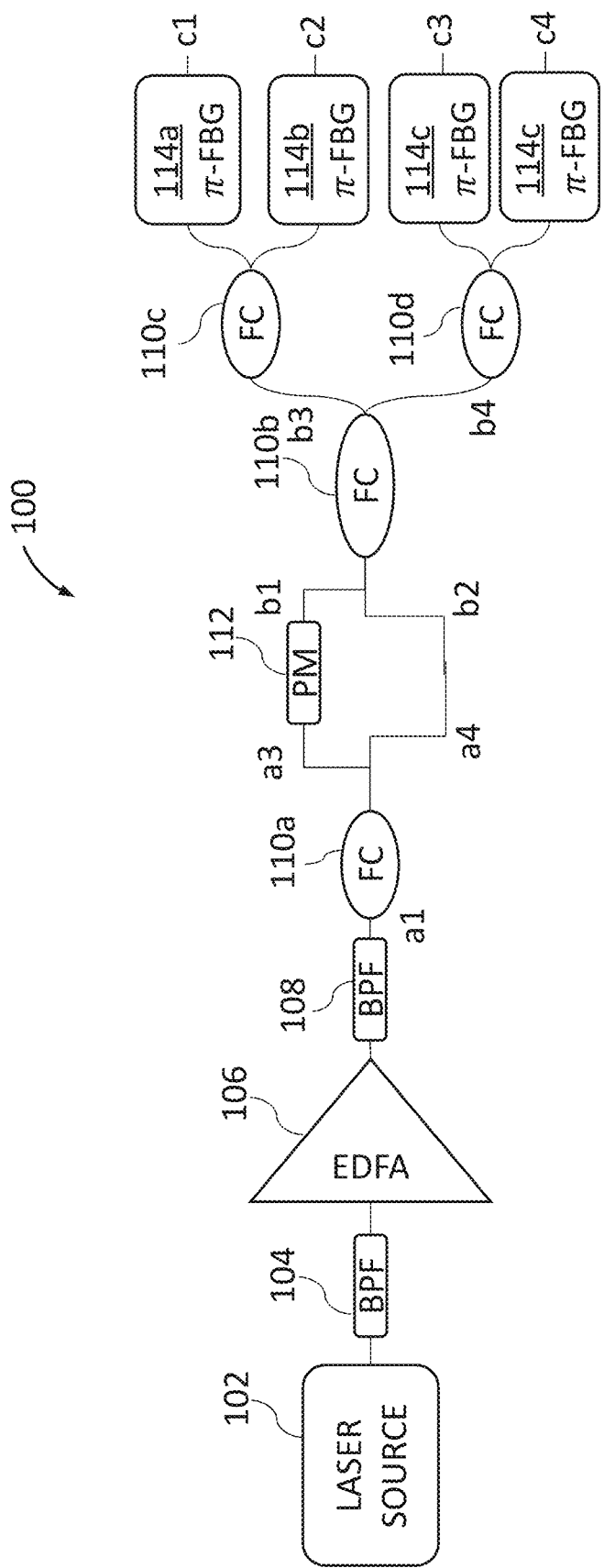
FIG. 1A is a schematic illustration of an exemplary PM-PI system, according to an embodiment.

FIG. 1A is a schematic illustration of an exemplary PM-PI system 100, according to an embodiment. In some embodiments, PM-PI system 100 may be used to interrogate 4 resonators, implemented with π-phase shifted fiber Bragg gratings (π-FBGs) 114a-114d (see, e.g., A. Rosenthal, D. Razansky, and V. Ntziachristos, "High-sensitivity compact ultrasonic detector based on a pi-phase-shifted fiber Bragg grating," Opt. Lett., OL, vol. 36, no. 10, pp. 1833-1835, May 2011) and connected to photodetectors whose voltage signals are sampled. A wideband pulse laser 102 with optical bandpass filters (BPF) 104 and an erbium-doped fiber amplifier (EDFA) 106 create a source with a high spectral power density and sufficient bandwidth to cover the spectra of all the resonators 114a-114d. The modulation unit is an unbalanced Mach-Zehnder interferometer (MZI) with a phase modulator (PM) 112 on one of its arms, connected at the output of the source, where the phase is switched between two phase values with a difference of π/2. An unbalanced MZI induces different phase accumulation in each of its arms. This phase difference is modulated via the phase modulator PM 112.

Figure 1B:
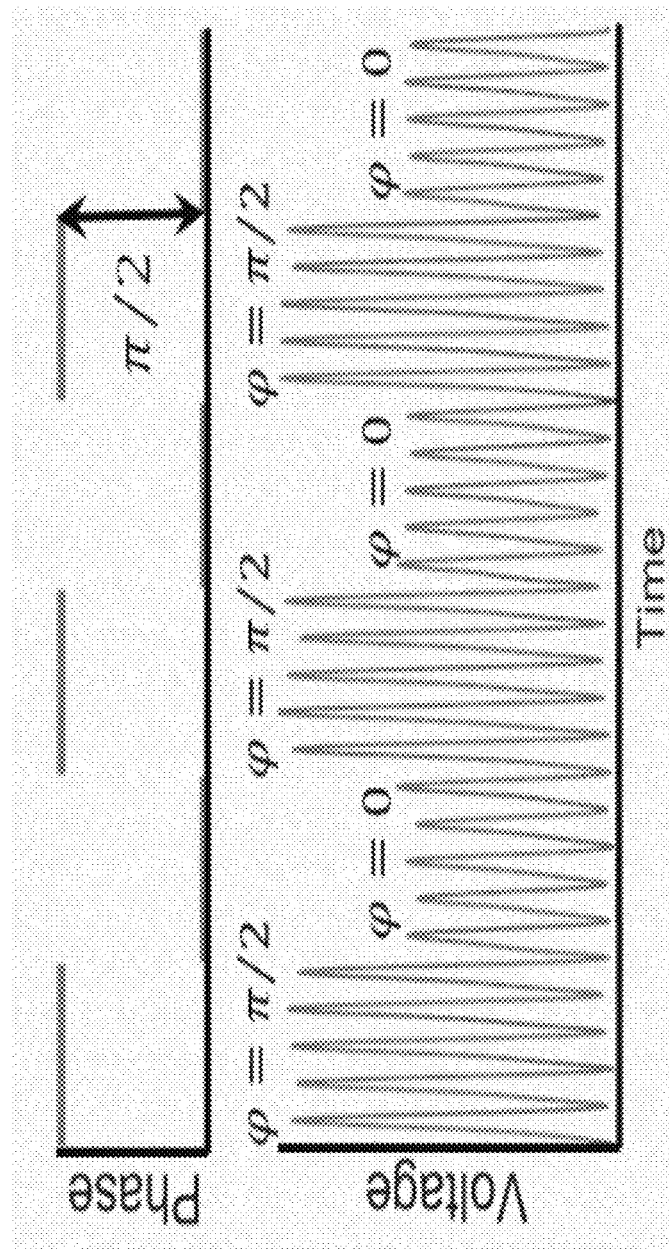
FIG. 1B shows an exemplary pulse-pair output beam of the present PM-PI system, according to an embodiment.

FIG. 1B shows an exemplary pulse-pair output beam of the MZI. In some embodiments, system 100 may be configured to generate a pulsed laser beam comprised of a pair of non-interfering pulse trains. In some embodiments, the pulse-pairs are generated such that they are non-overlapping. In some embodiments, the pulse-pairs are non-overlapping in time, i.e., they are guided in the same spatial coordinates and have the same spectrum, however, they arrive in a temporally-sequential manner. In some embodiments, the pulse-pairs may have overlapping portions configured such that any overlap area has an instantaneous frequency that prevents interference of the pulse-pairs. In some embodiments, the non-interference is achieved through, e.g., absence of temporal overlap between the pulse-pairs, or absence of spectral (frequency) overlap in the case of temporally-overlapping parts.

With continued reference to FIG. 1B, in some embodiments, the phase difference changes between each two consecutive cycles of the pulse-pairs. In some embodiments, each pulse-pair cycle comprises one or more consecutive pulse-pairs, e.g., between 1 and 5 pulse-pairs. In some embodiments, each cycle may comprise more than 5 pulse-pairs. In some embodiments, the pulse-pairs have identical wavelengths. The exemplary pulse-pair depicted in FIG. 1B has a cycle comprising 5 pulse pairs. The top part of FIG. 1B shows the phase difference between the two pulse-pairs as a function of time. The bottom part shows the interference at the output of an optical resonator, as measured by a photodetector, wherein for each phase-difference value, there is a corresponding interference.

For each phase value, the pulses interfere differently at the output of each resonator 114a-114d, depending on the phase difference in the MZI for the specific resonance wavelength of that resonator. In some embodiments, the duration of each phase value of the modulator corresponded to 5 pulses of the laser. In some embodiments, the output of each resonator 114a-114d is switched between two interferometric states, which together enable monitoring wavelength shifts of its resonance.

In some embodiments, PM 112 has only two phase states that may be experienced by each pulse, wherein the transition between the two states occurs at times when no light passes through the PM. In some embodiments, the electric fields at different positions in PM-PI system 100 are marked with the letters a-c in FIG. 1A. The electric field at the input of the MZI, i.e., at point (a1), is given by $$e_1^a = 2e(\omega),$$

where ω is the angular frequency. At the two outputs of the first coupler 110*a*, points (a3) and (a4), the electric fields are given by, respectively $$e_3^a = \sqrt{2} e(\omega),$$

and $$e_4^a = \sqrt{2} i e(\omega),$$

wherein at the two inputs of the second coupler 110*b*, points (b1) and (b2), the following can be obtained:

$$e_1^b = \sqrt{2} e(\omega) \exp(i\varphi_{PM} + i\omega n l_1/c) \quad (1a)$$

$$e_2^b = \sqrt{2} i e(\omega) \exp(i\omega n l_2/c) \quad (1b)$$

where $l_1$ and $l_2$ are the lengths of the top and bottom arms of the MZI, respectively, n is the refractive index of the fiber, c is the speed of light, and $\varphi_{PM}$ is the phase contribution of the PM, which may be equal to either 0 or $$\frac{\pi}{2},$$

where $\Delta l = l_2 - l_1$.

Neglecting global phase accumulation, the electric fields at the output of the second coupler, b3 and b4, are given by:

$$e_3^b = e(\omega)[\exp(i\varphi_{PM}) - \exp(i\omega n \Delta l/c)] \quad (2a)$$

$$e_4^b = e(\omega)[\exp(i\varphi_{PM}) + \exp(i\omega n \Delta l/c)], \quad (2b)$$

where $\Delta l = l_2 - l_1$.

At the final stage of system, 100, the electric fields $e_3^b$ and $e_4^b$ can be filtered by the resonators 114*a*-114*d*, whose field transmission functions is denoted by $H_i(\omega)$, where i=1, . . . , 4.

For each resonator 114*a*-114*d*, the central frequency is denoted by $\omega_i$ and the bandwidth is denoted by $\Delta\omega_i$. In such cases, the assumption is that $\Delta l$ is sufficiently small so that $\exp(i\omega n\Delta l/c)$ is approximately constant over $\Delta\omega_i$ (i=1, . . . , 4). In some embodiments, the corresponding mathematical condition can be given by:

$$\Delta\omega_i n\Delta l/c << 2\pi \quad (3)$$

In some embodiments, in cases where Eq. (3) is fulfilled, the spectra at the output of the resonators may be approximated by the following expressions:

$$e_{1,2}^c = e_{1,2} H_{1,2}(\omega)[\exp(i\varphi_{PM}) - \exp(i\omega_{1,2} n\Delta l/c)] \quad (4a)$$

$$e_{3,4}^c = e_{3,4} H_{3,4}(\omega)[\exp(i\varphi_{PM}) + \exp(i\omega_{3,4} n\Delta l/c)] \quad (4b)$$

where $e_i = e(\omega_i)$. The power at the output of each π-FBG is thus given by:

$$P_i^c = P_i[1 - \cos(\varphi_i + \varphi_{PM} - \omega_i n\Delta l/c)] \quad (5)$$

where $P_i = 2\int |e_i H_i(\omega)|^2 d\omega$, and where $\varphi_i = 0$ for i=1,2 and $\varphi_i = \pi$ for i=3,4. In practice, $\Delta l$ may not fully fulfill the condition in Eq. (3), leading to the following modification in Eq. (5):

$$P_i^c = P_i[1 - \eta_i \cos(\varphi_i + \varphi_{PM} - \omega_i n\Delta l/c)], \quad (6)$$

where $\eta_i \leq 1$ shows the visibility of the interference.

Assuming that the two-phase states of the PM lead to $\varphi_{PM} = 0$ and $\varphi_{PM} = \pi/2$, for each channel two expressions are obtained for the measured power, corresponding to the two states:

$$P_{i,0}^c = P_i[1 - \eta_i \cos(\varphi_i - \omega_i n\Delta l/c)] \quad (7a)$$

$$P_{i,\pi/2} = P_i[1 + \eta_i \sin(\varphi_i - \omega_i n\Delta l/c)], \quad (7b)$$

When $P_i$ and $\eta_i$ are known from a pre-measurement calibration procedure, the sine and cosine in Eqs. (7a) and (7b) may be readily calculated from $P_{i,0}^c$ and $P_{i,\pi/2}$, and used to calculate the phase $\phi_i = \varphi_i - \omega_i n\Delta l/c$, using the four-quadrant inverse tangent (atan 2) and a phase unwrapping algorithm (see, e.g., J. M. Huntley and H. Saldner, "Temporal phase-unwrapping algorithm for automated interferogram analysis," Appl. Opt., AO, vol. 32, no. 17, pp. 3047-3052, June 1993).

When an acoustic pulse impinges on a resonator, it leads to a modulation in $\omega_i$. Accordingly, $\omega_i(t) = \omega_i^{dc} + \omega_i^{ac}(t)$ may be defined, where $\omega_i^{dc}$ represents the resonance frequency before the arrival of the acoustic pulse, and $\omega_i^{ac}(t)$ is the ultrasound-induced perturbation to be recovered. Assuming that the MZI is not exposed to the acoustic pulse, the term $n\Delta l$ may be regarded as constant during the acoustic measurement. Thus, $\omega_i^{ac}(t)$ may be readily recovered from $\phi_i(t)$:

$$\omega_i^{ac}(t) = \frac{c[\varphi_i - \phi_i(t)]}{n\Delta l} - \omega_i^{dc} \quad (8)$$

In practice, $\omega_i^{ac}(t)$ may be obtained by applying a high-pass filter on the right-hand side of Eq. (8), while ignoring the values of $\varphi_i$ and $\omega_i^{dc}$.

Figure 2:
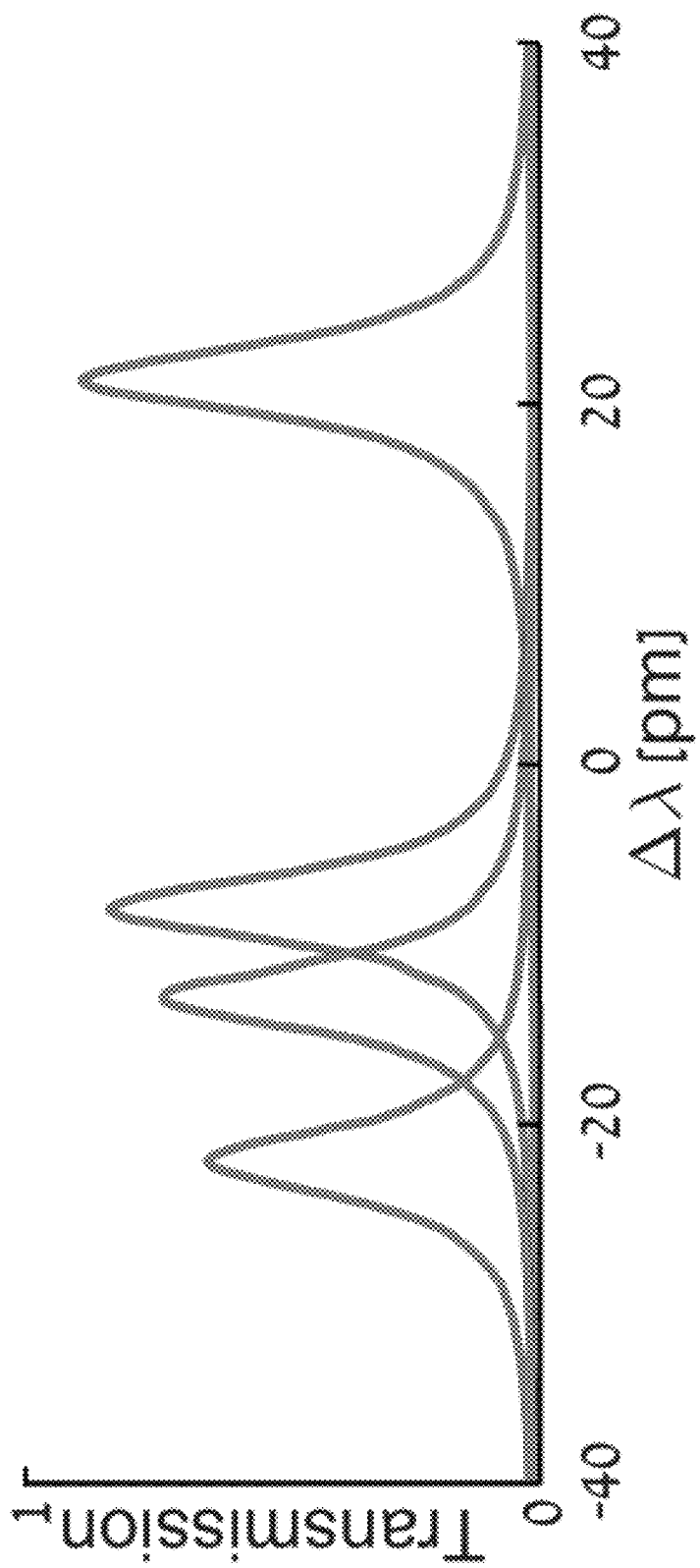
FIG. 2 shows resonance spectra of exemplary π-FBGs resonators used in an exemplary PM-PI system, according to an embodiment.

FIG. 2 shows the resonance spectra of the 4 π-FBGs resonators 114*a*-114*d* (e.g., exemplary π-FBGs made by TeraXion, Inc. of Quebec, Canada) used in the measurements, according to some embodiments of the disclosed subject matter. In some embodiments, the measurements in exemplary PM-PI system 100 may can be used as a function of detuning from the central wavelength of 1549 nm. In some embodiments, the resonances may have a full-width-at-half-maximum (FWHM) of approximately 4 pm, whereas the spectral distance between two resonances may have a maximum value of approximately 43 pm, preventing parallel interrogation with CW techniques. The pulse laser 102 (in an exemplary implementation, an M-Comb model made by Menlo Systems GmbH, Martinsried, Germany) has a central wavelength of 1560 nm, pulse repetition rate of 250 MHz, pulse duration of approximately 90 fs, and average power of 75 MW, wherein each of the BPFs 104, 108 has a spectral width of 0.4 nm around the resonance wavelength, sufficiently wide to cover all the 4 resonances shown in FIG. 2. In some embodiments, all the components of system 100 may be implemented with polarization-maintaining fibers, to avoid polarization fading in the setup (see, e.g., D. Stowe, D. Moore, and R. Priest, IEEE J. Quantum Electron., 18, 1644, (1982)).

In some embodiments, the output power from each of the π-FBGs 114*a*-114*d* is approximately 25 μW when the EDFA 106 is set to 100 mW average power output. In some embodiments, the components in PM-PI system 100 may be implemented with polarization-maintaining fibers to avoid polarization fading in the setup (see, e.g., D. Stowe, D. Moore, and R. Priest, "Polarization fading in fiber interferometric sensors," IEEE Journal of Quantum Electronics, vol. 18, no. 10, pp. 1644-1647, October 1982).

In some embodiments, the MZI in FIG. 1A has an imbalance of $\Delta l = 7$, and includes a PM 112 with a modulation bandwidth of 20 GHz (e.g., a PM-5S5-10-PFA-PFA-UV-UL, made by EOspace, Inc.). The PM 112 may be fed with a square voltage signal with a frequency of 25 MHz and duty cycle of 50%, and the modulated signals at the output of the π-FBGs 114*a*-114*d* may be detected by photodetectors with a bandwidth of 1.5 GHz (e.g., DET01CFC, made by Thorlabs, Inc.), connected to a 4-channel oscilloscope with a bandwidth of 1.5 GHz.

In some embodiments, as shown in FIG. 1A, each cycle of the voltage signal corresponds to 10 pulses, half of which with the response given in Eq. 7a and half with the response of Eq. 7b. Because the voltage signal may not be synchronized with the repetition rate of the laser source 102, some of the laser pulses may occasionally overlap with the transition between the two states of $\varphi_{PM}$. To avoid transition effects, $P_{i,0}{}^c$, $P_{i,\pi/2}{}^c$ were extracted from the photodetector signals by calculating the median value for every 5 pulse peaks within half a cycle of the PM 112.

In some embodiments, the performance of PM-PI system 100 may be evaluated using an acoustic setup, e.g., as set forth in Rosenthal [2011], Rosenthal [2012], and Hazan [2018]. The π-FBGs 114a-114d may be placed in a water bath briefly, along with an ultrasound transducer with a central frequency of 1 MHz. To maximize the resonance frequency shift in the fibers, the orientation of the transducer may be adjusted to an angle of 30° with respect to the optical fibers, leading to excitation of a guided acoustic wave in the fibers, which has been previously shown to generate a stronger response than normal-incidence waves (see, e.g., A. Rosenthal, M. Á. A. Caballero, S. Kellnberger, D. Razansky, and V. Ntziachristos, Opt. Lett., 37, 3174, (2012); I. A. Veres, P. Burgholzer, T. Berer, A. Rosenthal, G. Wissmeyer, and V. Ntziachristos, J. Acoust. Soc. Am., 135, 1853, (2014)).

In a first measurement, the signal from a single π-FBG may be measured using the present system as well as the original implementation of PI developed in Rosenthal [2012], in which active stabilization of the MZI was used (A-PI). Since A-PI suffers from non-linear signal folding when the acoustic signal is too strong (Hazan [2018]), the magnitude of the ultrasound burst may be chosen to be sufficiently small to fit the linear-operation range of the MZI, i.e., 600 MHz in the present implementation.

Figure 3A:
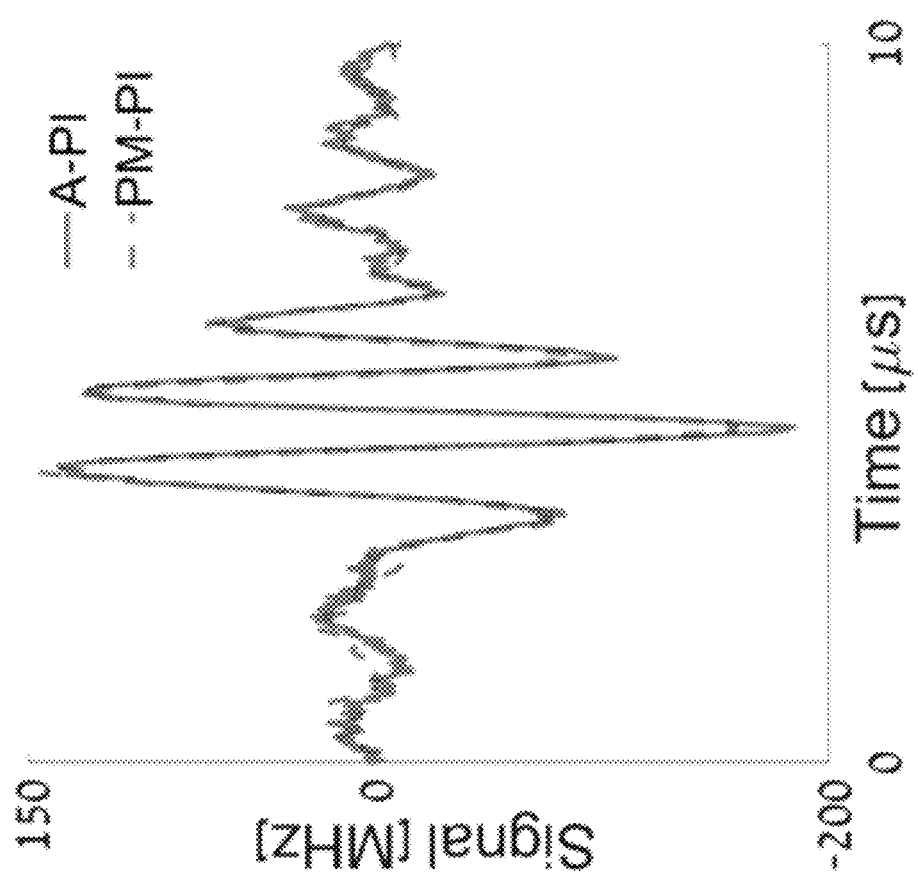
FIGS. 3A-3B show a frequency shift of exemplary π-FBGs resonators used in an exemplary PM-PI system, according to an embodiment.
Figure 3B:
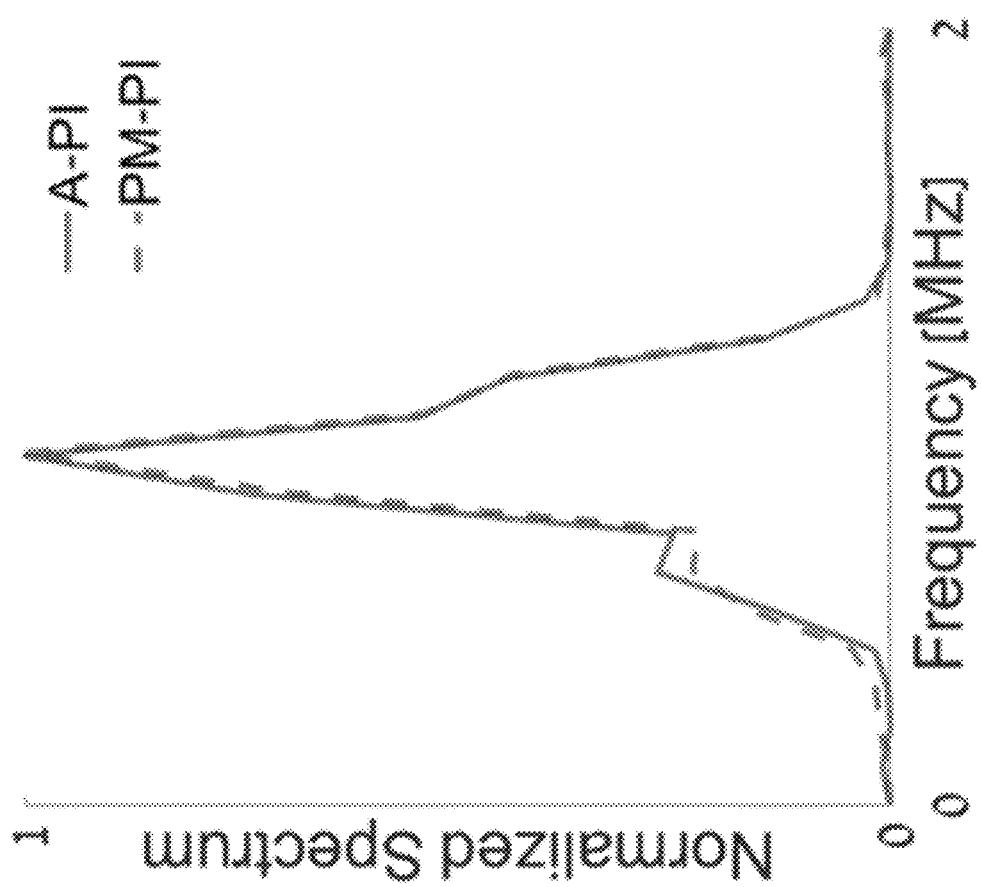

FIGS. 3A-3B show the frequency shift of the π-FBG, $dv(t)=\omega^{ac}$, measured with A-PI as well as the present PM-PI system. The acoustic signals and corresponding spectra measured by the two techniques are in very good agreement as shown in FIGS. 3A and 3B, respectively. The small differences may be attributed to a deviation from the π/2 phase difference between the two interleaved signals in the implementation of PM-PI. The measurement bandwidth in PM-PI is limited to 12.5 MHz, i.e. half of the phase-modulation frequency. Using this bandwidth, the minimum detectable resonance shifts for A-PI and PM-PI are 3 MHz and 10 MHz, respectively.

Figure 4:
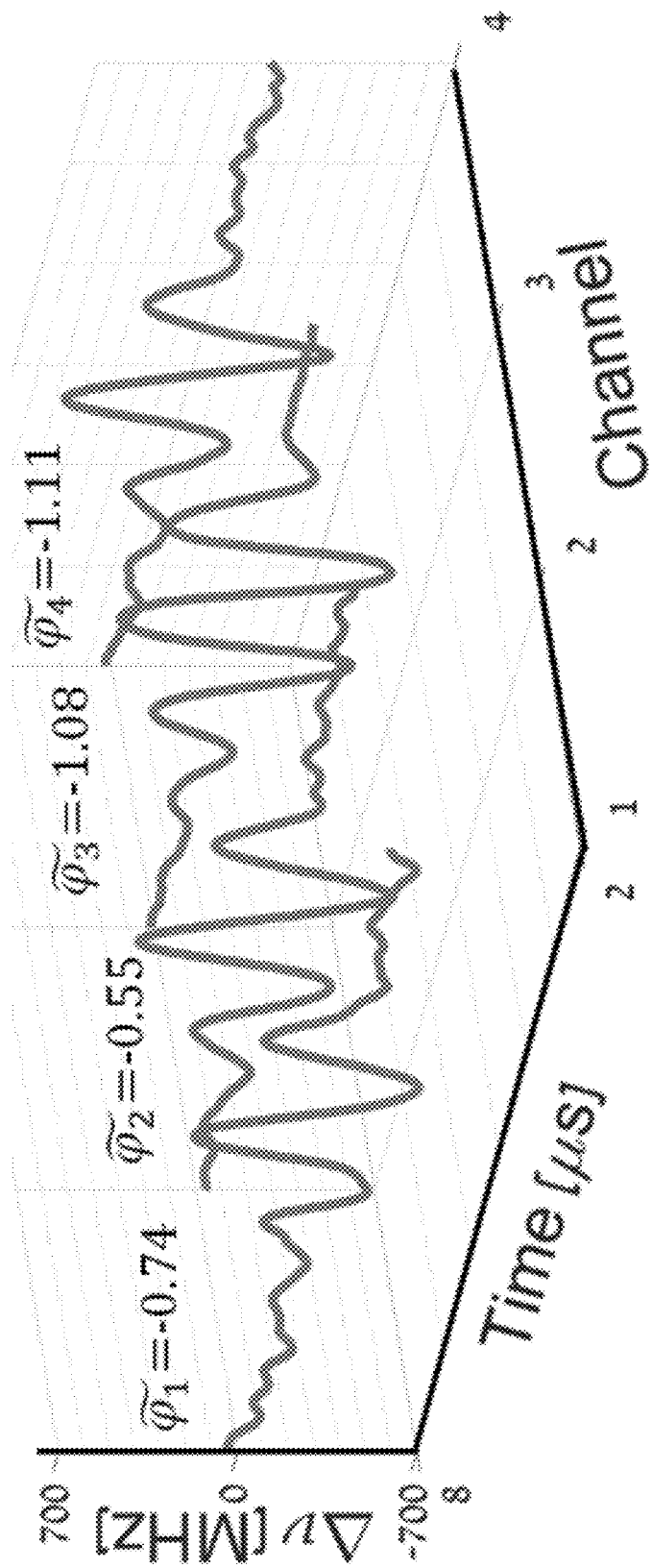
FIG. 4 shows measured resonance shifts of exemplary π-FBGs resonators used in an exemplary PM-PI system, according to an embodiment.

In the second measurement, the ability of PM-PI for parallel interrogation is demonstrated with the four π-FBGs whose spectra are shown in FIG. 2. The π-FBGs are positioned in proximity to each other and in a 30° angle with respect to the ultrasound transducer. To demonstrate that, in contrast to A-PI, PM-PI does not suffer from signal folding, the acoustic pressure produced by the ultrasound transducer is increased by a factor of 4 with respect to the first measurement. The measured resonance shifts of the four 7c-FBGs are shown in FIG. 4. Because the π-FBGs were placed at different positions within the acoustic beam with possible differences in their exact orientations, the signals vary in their amplitude and delays. The strongest measured resonance shift had a peak-to-peak value of 1 GHZ, i.e. twice larger than the resonance width. Such a large shift cannot be properly measured using A-PI or conventional CW interrogation, as previously demonstrated in Hazan [2018].

Accordingly, in some embodiments, there is demonstrated a novel scheme for parallel interrogation of resonator-based interferometric detectors of ultrasound. The present disclosure is based on a variation PI, in which the pulses are modulated at the input of the resonators by a PM. The modulation enables the coding in time of two interference states, which facilitates digital demodulation of the desired signals from simple power measurements. While the PM in this work operated at only 10% of the pulse rate, reducing the measurement bandwidth by the same proportion, in an ideal implementation the PM modulation frequency may be set at 50% of the pulse repetition rate. For the pulse laser used in this work, which had a repetition rate of 250 MHz, PM-PI with a modulation frequency of 125 MHz corresponds to an acoustic bandwidth of 62.5 MHz, which is compatible with most imaging applications.

In some embodiments, the present disclosure may overcome a major limitation of interferometric detectors of ultrasound—the inability to simultaneously interrogate several resonators with non-overlapping spectra.

What is claimed is:

1. A method of detecting acoustic waves, the method comprising:
generating a pulsed laser beam comprised of cycles of pulse-pairs, each comprising one or more consecutive pulse-pairs, wherein the pulse pairs are temporally non-overlapping, and thus non-interfering, and wherein each pulse-pair has a phase difference within the pair, and wherein said phase difference changes between each two consecutive cycles of said pulse-pairs;
directing said pulsed laser beam at one or more optical resonators, wherein each of said one or more optical resonators is impinged by acoustic waves, to cause said pulsed laser beam to propagate through each of said one or more optical resonators, leading to temporal broadening and overlap between the two pulses, thereby interfering said pulse-pairs; and
calculating shifts in a spectral response of each of said one or more optical resonators based on measuring said interference, wherein said shifts are indicative of a waveform of said acoustic waves.

2. The method of claim 1, wherein said calculating is performed with respect to at least two consecutive cycles of said pulse-pairs.

3. The method of claim 1, wherein said pulse-pairs have identical wavelengths.

4. The method of claim 1, wherein said one or more optical resonators are selected from the group consisting of: π phase-shifted Bragg grating (π-BG), Fabry-Perot cavity, and optical-ring resonator.

5. The method of claim 1, wherein said generating of said pulse-pairs is performed from a single pulse via an active unbalanced Mach-Zehnder interferometer (MZI) with a phase modulator in one of its arms.

6. The method of claim 5, wherein said phase modulator is configured to induce a constant phase shift during a duration of each of said pulses.

7. The method of claim 1, wherein said measuring further comprises measuring an optical power transmission in said propagated pulsed laser beam, wherein said optical power transmission is indicative of said shifts in said spectral response.

8. The method of claim 7, wherein said measuring of said optical power transmission is performed by at least one photo-detector.

9. The method of claim 1, wherein said acoustic waves are ultrasound acoustic waves.

10. A system for detecting acoustic waves comprising:
one or more optical resonators;
a pulsed laser beam source configured to generate a pulsed laser beam; and
an interferometer configured to generate, from the pulsed laser beam cycles of pulse-pairs, each comprising one or more consecutive pulse-pairs,
wherein the pulse pairs are temporally non-overlapping of and thus non-interfering,
and wherein each pulse-pairs has a phase difference within the pair,
and wherein said phase difference changes between each two consecutive cycles of said pulse-pairs,
and wherein said pulse-pairs are directed to said one or more optical resonators to propagate said pulse-pairs through said one or more optical resonators, thereby interfering said pulse-pairs.

11. The system of claim 10, wherein said interferometer is further configured to measure said interference subsequent to said one or more optical resonators being impinged by acoustic waves, to calculate shifts in a spectral response of each of said one or more optical resonators based on said measuring, wherein said shifts are indicative of a waveform of said acoustic waves.

12. The system of claim 11, wherein said calculating is performed with respect to at least two cycles of said pulse-pairs.

13. The system of claim 10, wherein each of said cycles of said pulse-pairs comprises one or more consecutive pulse-pairs.

14. The system of claim 10, wherein said pulse-pairs have identical wavelengths.

15. The system of claim 10, wherein said one or more optical resonators are selected from the group consisting of: π phase-shifted Bragg grating (π-BG), Fabry-Perot cavity, and optical-ring resonator.

16. The system of claim 10, wherein said interferometer is an active unbalanced Mach-Zehnder interferometer (MZI) with a phase modulator in one of its arms, configured to generate said pulse-pairs from a single pulse.

17. The system of claim 16, wherein said phase modulator is configured to induce a constant phase shift during a duration of each of said pulses.

18. The system of claim 10, wherein said interferometer is further configured to measure an optical power transmission in said propagated pulsed laser beam, wherein said optical power transmission is indicative of said shifts in said spectral response.

19. The system of claim 18, wherein said measuring of said optical power transmission is performed by at least one photo-detector.

* * * * *